US007958130B2

(12) United States Patent
Manolescu

(10) Patent No.: US 7,958,130 B2
(45) Date of Patent: Jun. 7, 2011

(54) SIMILARITY-BASED CONTENT SAMPLING AND RELEVANCE FEEDBACK

(75) Inventor: Dragos A. Manolescu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 429 days.

(21) Appl. No.: 12/127,002

(22) Filed: May 26, 2008

(65) Prior Publication Data

US 2009/0292732 A1 Nov. 26, 2009

(51) Int. Cl.
G06F 7/00 (2006.01)
G06F 17/30 (2006.01)

(52) U.S. Cl. ........................................ 707/749; 707/731

(58) Field of Classification Search ........................ None
See application file for complete search history.

(56) References Cited

U.S. PATENT DOCUMENTS

| 5,918,223 | A | 6/1999 | Blum et al. |
|---|---|---|---|
| 6,545,209 | B1 | 4/2003 | Flannery et al. |
| 7,003,515 | B1 | 2/2006 | Glaser et al. |
| 7,081,579 | B2 | 7/2006 | Alcalde et al. |
| 7,124,149 | B2 | 10/2006 | Smith et al. |
| 7,272,593 | B1* | 9/2007 | Castelli et al. ............... 707/600 |
| 7,319,964 | B1* | 1/2008 | Huang et al. .................. 704/278 |
| 2002/0143901 | A1* | 10/2002 | Lupo et al. .................... 709/219 |
| 2002/0161747 | A1* | 10/2002 | Li et al. ............................. 707/3 |
| 2002/0181711 | A1* | 12/2002 | Logan et al. ...................... 381/1 |
| 2003/0045953 | A1 | 3/2003 | Weare |
| 2003/0069877 | A1* | 4/2003 | Grefenstette et al. ............. 707/2 |
| 2003/0074369 | A1* | 4/2003 | Schuetze et al. .......... 707/103 R |
| 2003/0105589 | A1* | 6/2003 | Liu et al. ............................ 702/1 |
| 2003/0204492 | A1* | 10/2003 | Wolf et al. ......................... 707/3 |
| 2004/0002935 | A1* | 1/2004 | Attias ................................ 707/1 |
| 2004/0025180 | A1* | 2/2004 | Begeja et al. ................... 725/46 |
| 2004/0107195 | A1* | 6/2004 | Trepess .............................. 707/3 |
| 2005/0022239 | A1* | 1/2005 | Meuleman ...................... 725/46 |
| 2005/0071780 | A1* | 3/2005 | Muller et al. ................. 715/825 |
| 2006/0074861 | A1* | 4/2006 | Wilensky .......................... 707/3 |

(Continued)

FOREIGN PATENT DOCUMENTS

WO     WO0120483 A2     3/2001

OTHER PUBLICATIONS

Interactive clustering of video segments for media structuring, Kinoshita et al. IEEE 2005.*

(Continued)

Primary Examiner — Pierre M Vital
Assistant Examiner — Augustine Obisesan
(74) Attorney, Agent, or Firm — Capitol City TechLaw; Richard C. Irving

(57) ABSTRACT

A method and a system may be provided to sample media content similar to media content enjoyed by a user. Feature vectors, which describe a number of characteristics, with respect to media content enjoyed by the user, may be employed to find similar media content from a media library, or a media service. The similar media content may be played, interleaved with requested media content. Relevance feedback, with respect to played media content, may be transparently or explicitly provided. The feature vectors may be updated based on the provided relevance feedback. Additional similar media content may be found from the media library, or the media service, based on the updated feature vectors, and may be played. An interface may be provided such that the user may purchase sampled, media content via a media device for playing the content.

14 Claims, 9 Drawing Sheets

U.S. PATENT DOCUMENTS

| | | | | |
|---|---|---|---|---|
| 2006/0259480 | A1* | 11/2006 | Zhang et al. | 707/5 |
| 2006/0265421 | A1 | 11/2006 | Ranasinghe et al. | |
| 2007/0078849 | A1* | 4/2007 | Slothouber | 707/5 |
| 2007/0208763 | A1* | 9/2007 | Muehlbauer | 707/100 |
| 2007/0237136 | A1* | 10/2007 | Sako et al. | 370/368 |
| 2007/0282860 | A1* | 12/2007 | Athineos et al. | 707/10 |
| 2007/0282935 | A1 | 12/2007 | Khan et al. | |
| 2008/0022844 | A1 | 1/2008 | Poliner et al. | |
| 2008/0242221 | A1* | 10/2008 | Shapiro et al. | 455/3.06 |

OTHER PUBLICATIONS

Hybrid recommender systems: survey and experiments, Burke et al, User modeling and use-adapted interaction 12: pp. 331-370, 2002.*

An Adaptive recommendation system without explicit acquisition of user relevance feedback, Shahabi et al, distributed and parallel databases, 14, pp. 173-192, 2003.*

Adaptive web search based on user profile constructed without any effort from users, Sugiyama et al, WWW 2004, May 17-22, 2004.*

Hoashi, et al., "Content-Based Music Retrieval Using Query Integration for Users with Diverse Preferences", Austrian Computer Society (OCG), 2007, pp. 4.

Pampalk, et al., "Improvements of Audio-Based Music Similarity and Genre Classification", Proceedings of ISMIR, Queen Mary,University of London, 2005, pp. 6.

* cited by examiner

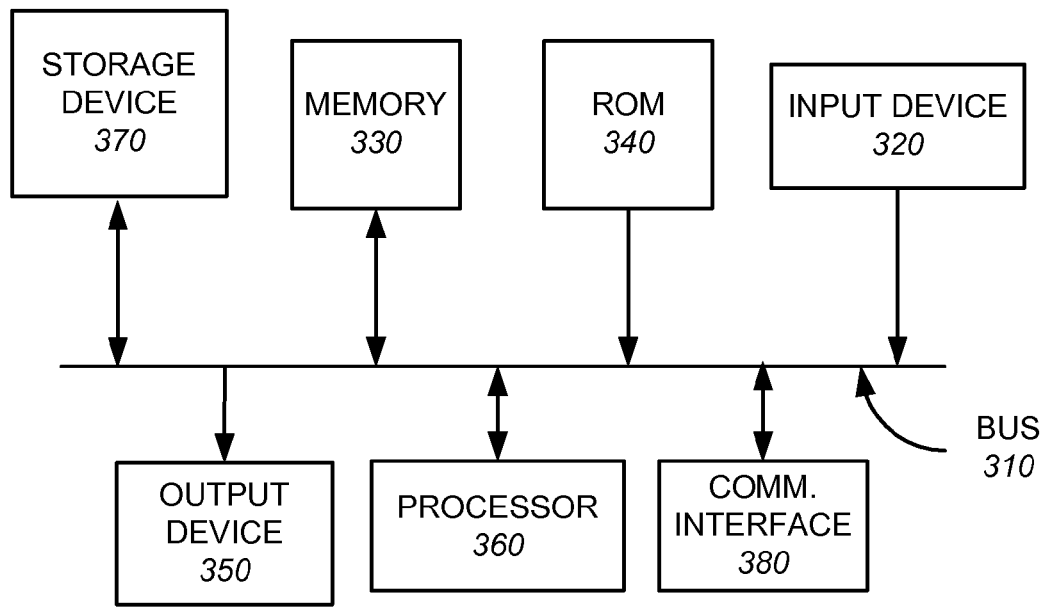
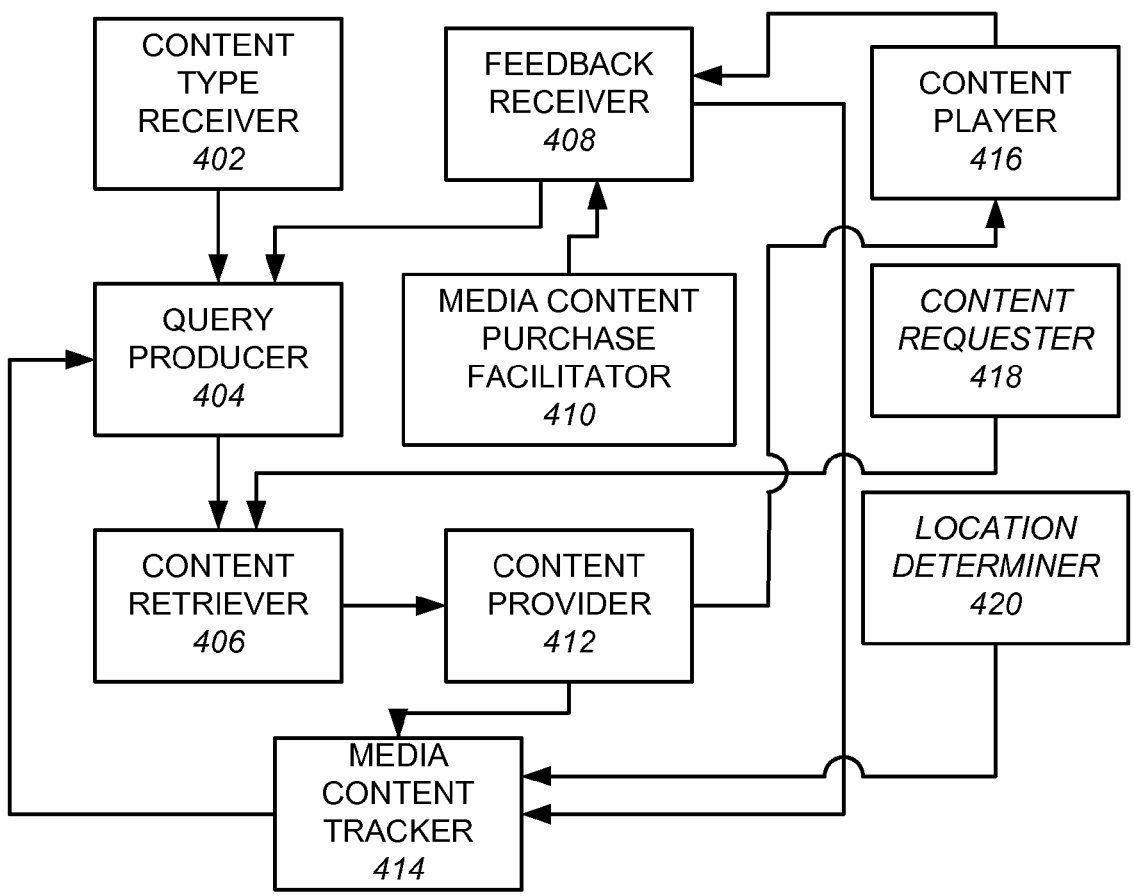

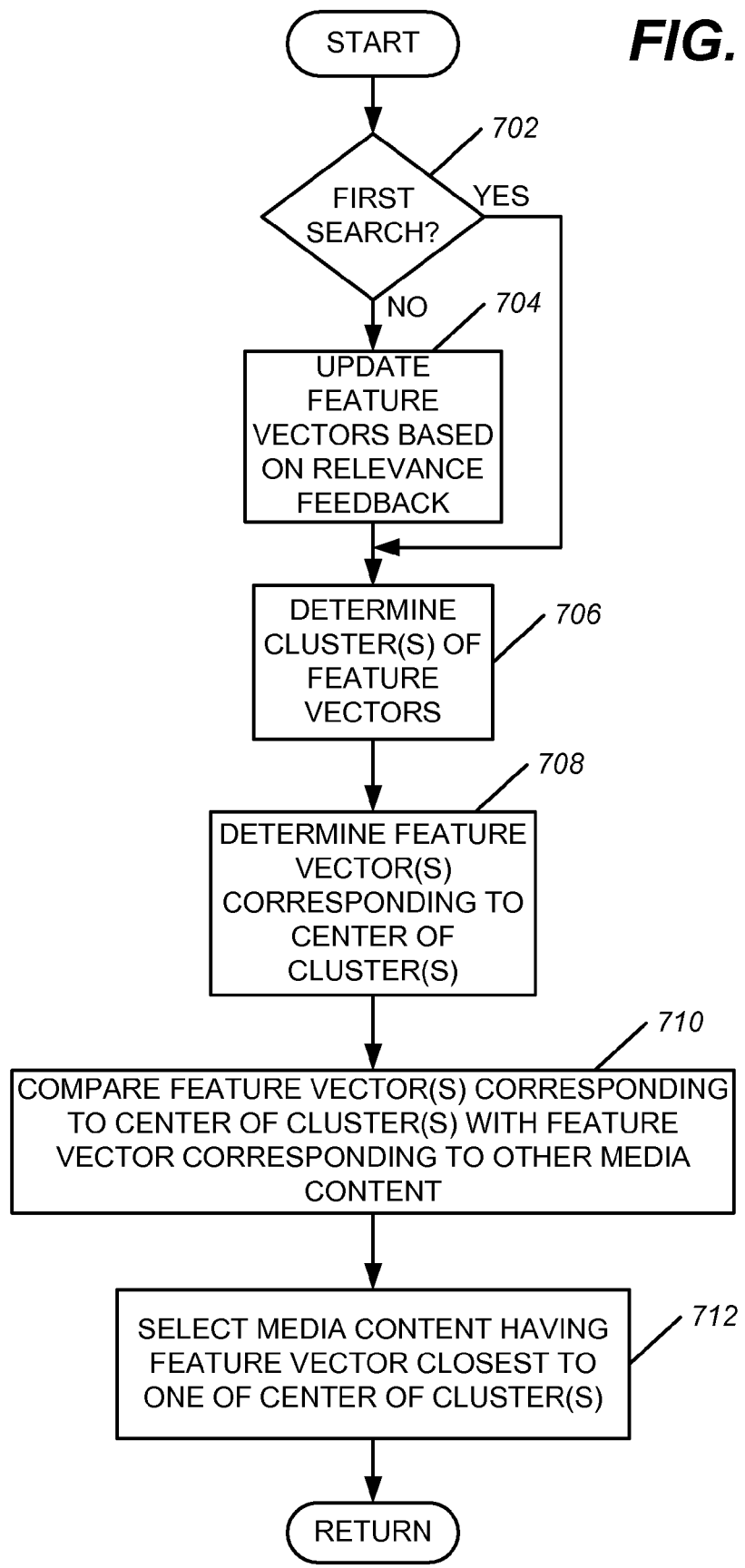

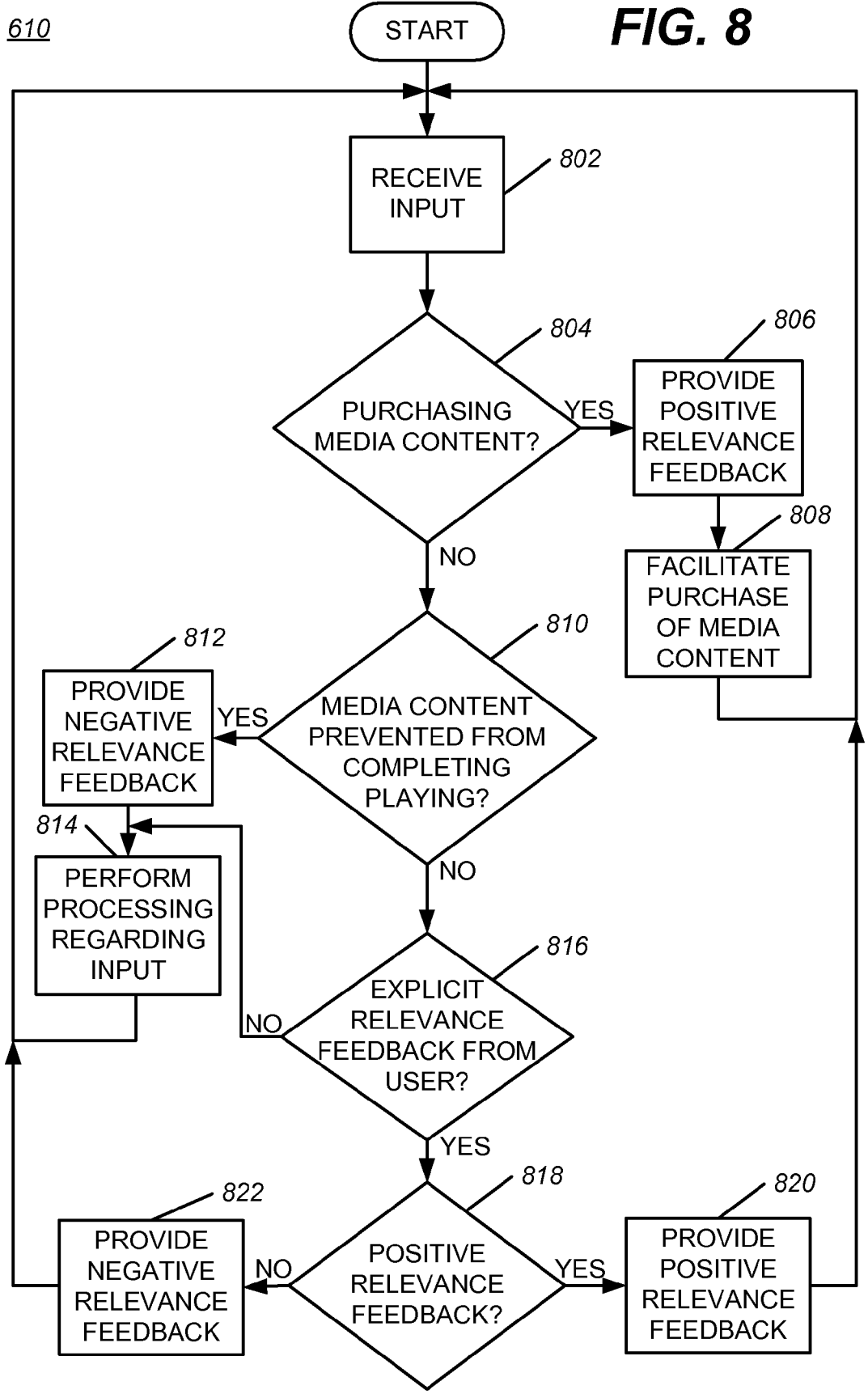

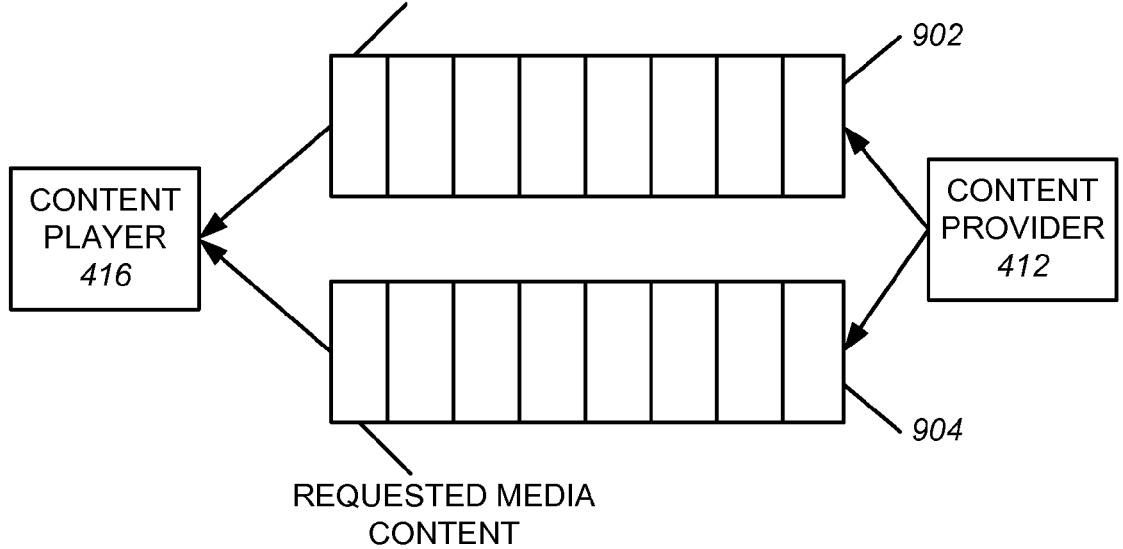
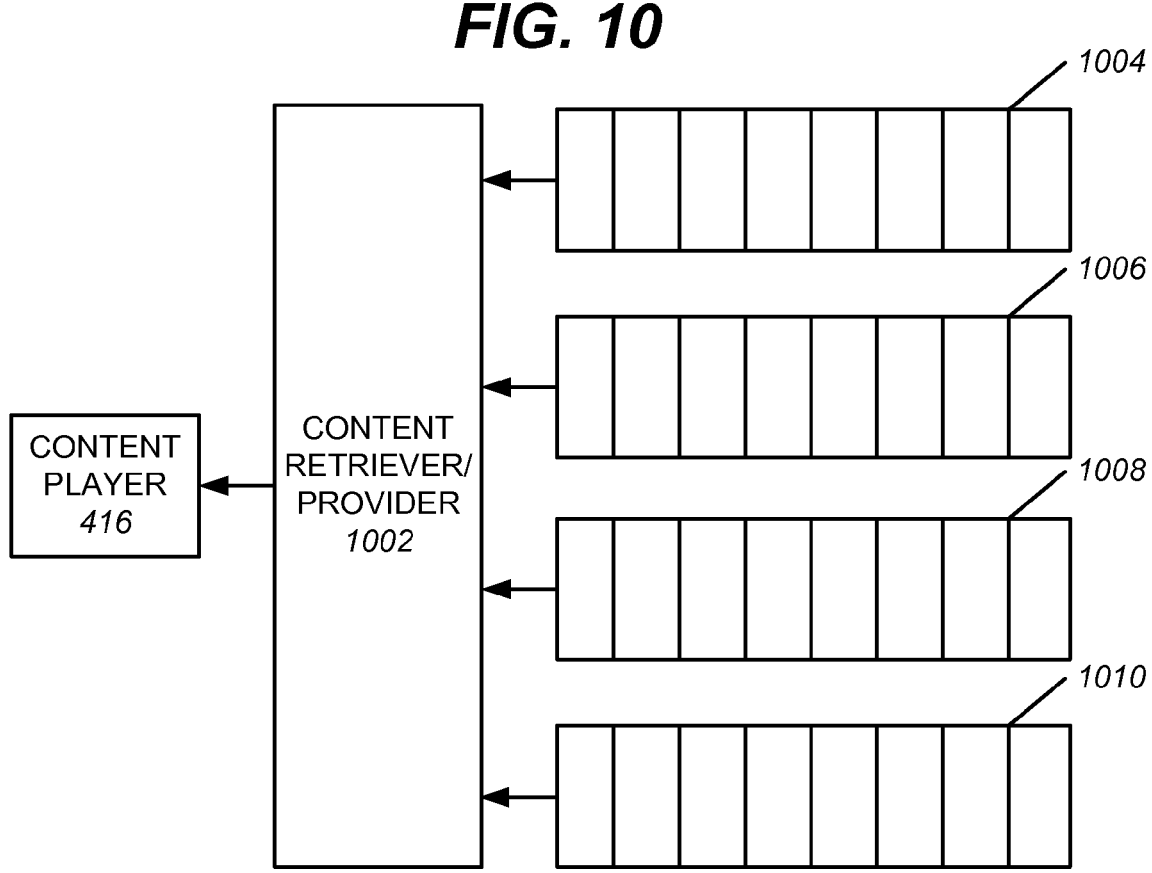

SIMILARITY-BASED CONTENT SAMPLING AND RELEVANCE FEEDBACK

BACKGROUND

Some existing media devices permit users to sample media content from other users' media devices. For example, a user may send media content from one media device to a media device of a friend. The friend may use the media content a limited number of times. If the friend likes the media content, the friend may purchase the media content.

If a user has a large social network including members with compatible media devices and tastes similar to the user, the user may have an opportunity to sample a large number of media content. Otherwise, the user may have little or no occasion to sample media content. Further, as long as there are no standards for sharing media content among media devices from different manufacturers, sampling of media content from other users' media devices may be limited by incompatibility of the media devices.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a system may be provided for selecting and playing, or sampling, media content similar to media content a user enjoys. Each item of media content may have an associated multidimensional feature vector, which describes features of the item of media content. A query for media content, based on consumed media content, may be assembled where the media content is consumed, such as, for example, a media device or a media player. Media content with feature vectors similar to feature vectors of media content consumed by the user may be retrieved from a media store or a media service and may be sampled on a media device and purchased directly from the device. When playing the sampled media content, a visual or audio indication may be provided to the user. The user may purchase the sampled media content, via an interface of the media device, without forcing the user to use a different application to make the purchase or navigate to an online store. Thus, the user may continue to use the media device without an interruption.

In some embodiments, playing of the sampled media content may be interleaved with playing of media content requested by the user.

In other embodiments, one of a number of media content streams may be played. When media content of a second media content stream is determined to have media content more closely matching a user's taste, the second media content may be automatically played.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 is a functional block diagram of a processing device which may implement embodiments consistent with the subject matter of this disclosure.

FIG. 4 is a functional block diagram of a system consistent with the subject matter of this disclosure.

FIGS. 6-8 and 13 illustrate exemplary processing which may be performed in embodiments consistent with the subject matter of this disclosure.

FIGS. 9-12 illustrate exemplary variations of embodiments consistent with the subject matter of this disclosure.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A method, a processing device, and a system are provided that may permit media content to be selected for sampling based on features of items of media content that a user enjoys. The media content may include, for example, music, video, audio, games, photos, electronic books, and/or other media content. Each item of media content may have an associated feature vector, which describes features of the item of media content. The feature vectors associated with the items of media content may be predefined and included as metadata with the media content. Alternatively, the feature vectors may be computed on media devices for playing the media content or may be computed on other devices.

Feature vectors, with respect to music content, may include information about 300, or another suitable number of features of the music content, such as, for example, a gender of a lead vocalist, a level of distortion on electric guitar, a type of background vocals, a presence of electric piano, drums, and/or other or different features. Some types of music content may have associated feature vectors describing a particular number of features, while other types of music content may have associated feature vectors describing a different number of features. The feature vectors may be refined to more accurately reflect a user's taste as feedback is transparently or non-transparently provided.

Media content having feature vectors similar to the feature vectors reflecting the user's taste may be retrieved from a media store and sampled on the media device and/or purchased via the media device. A visual or audio indication may be provided to inform the user that the played media content is a sample, which may be available for purchase. If the user desires, the sampled media content may be purchased via an interface of the media device.

Exemplary Operating Environments

Figure 1:
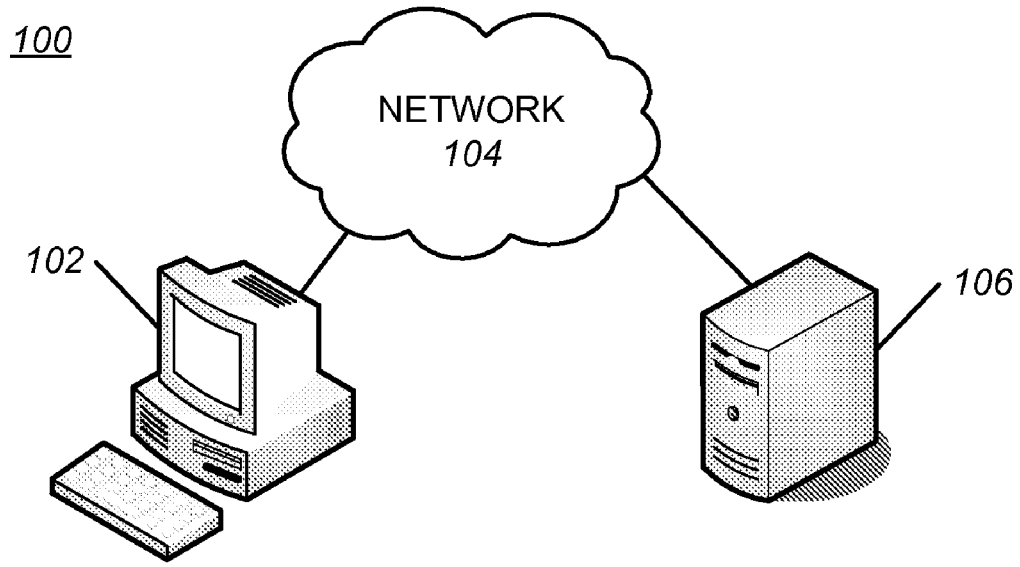
FIG. 1 illustrates an exemplary operating environment for a first embodiment consistent with the subject matter of this disclosure.

FIG. 1 illustrates an exemplary operating environment 100 for embodiments consistent with the subject matter of this disclosure. Operating environment 100 may include a first processing device 102, a network 104, and a second processing device 106.

First processing device 102 may be a desktop personal computer (PC), a laptop PC, or other processing device. First processing device 102 may be connected to network 104 via a cable or a wireless connection.

Network 104 may be a single network or a combination of networks, such as, for example, the Internet or other networks. Network 104 may include a wireless network, a wired network, a packet-switching network, a public switched telecommunications network, a fiber-optic network, other types of networks, or any combination of the above.

A second processing device 106 may include a server or a server farm having a media store with media content stored thereon.

In operating environment 100, media content may be played on first processing device 102. Media content may be provided to first processing device 102 by second processing device 106, via network 104, based on a query provided by first processing device 102 to second processing device 106. The query may be based on one or more feature vectors reflecting a user's preferences, such as music the user has been listening to recently.

Second processing device 106 may perform a similarity search, based on the provided query, to find similar media content in the media store. The similar media content may have one or more feature vectors similar to the one or more feature vectors included in the query. The similar media content may be provided to the first processing device 102, which may sample the similar media content and may provide an interface through which the user may purchase the similar media content.

Figure 2:
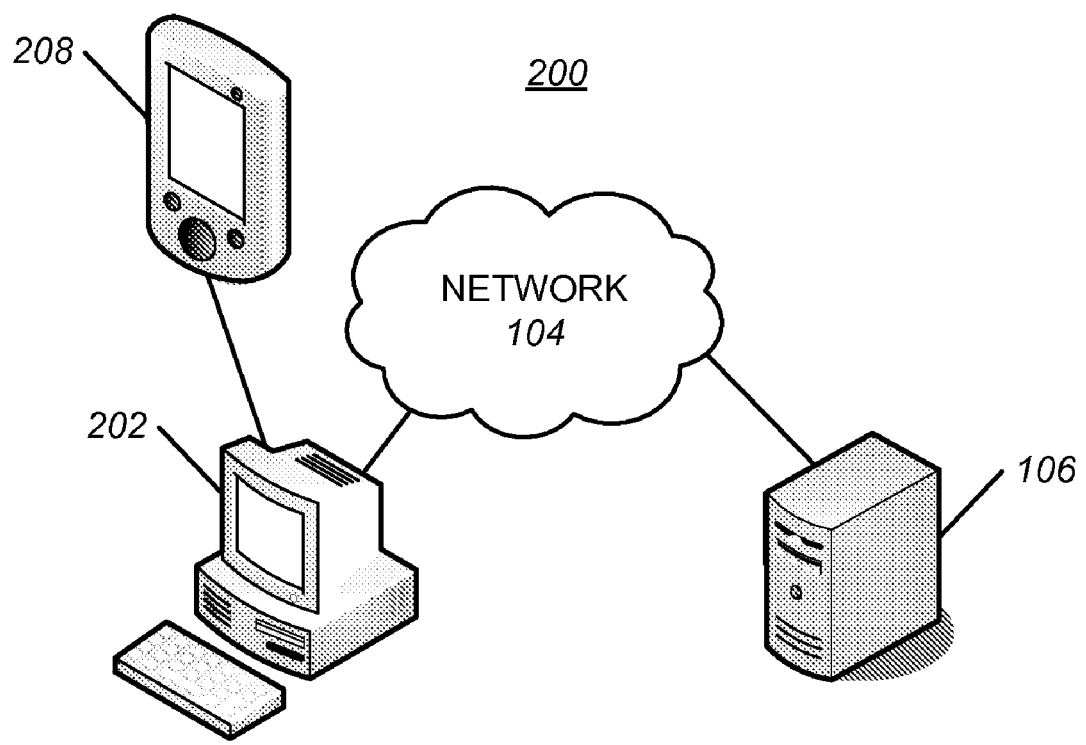
FIG. 2 illustrates an exemplary operating environment for a second embodiment consistent with the subject matter of this disclosure.

FIG. 2 illustrates a second exemplary operating environment 200 for other embodiments consistent with the subject matter of this disclosure. Operating environment 200 may include a first processing device 202, network 104 (as previously described), second processing device 106 (as previously described), and a third processing device 208.

First processing device 202 may be a desktop personal computer (PC), a laptop PC, or other processing device, connected to network 104 via a wireless connection or via a cable. First processing device 202 may include a personal storage or media library having media content stored therein.

Third processing device 208 may be a portable or handheld processing device capable of playing media content. Third processing device 208 may be connected to second processing device 202 via a wireless connection or via a cable. Third processing device 208 may request an item of media content from first processing device 202, which may then send the requested item of media content to third processing device 208. Third processing device 208 may then play or sample the requested item of media content.

First processing device 202 may assemble feature vectors corresponding to requested items of the media content and may determine one or more clusters formed by the assembled feature vectors. One or more vectors corresponding to centers of the one or more clusters may then be determined and included in a query sent to second processing device 106 via network 104.

Alternatively, third processing device 208 may assemble the feature vectors corresponding to the requested items of media content and may determine the one or more clusters formed by the assembled feature vectors. Third processing device 208 may determine the one or more vectors corresponding to the center of the one or more clusters and may include the vectors in a query sent to second processing device 106 via first processing device 202 and network 104.

Second processing device 106 may obtain items of the media content, included in the media store, and may provide the obtained items of the media content to first processing device 202. First processing device 202 may then send the obtained items of the media content to third processing device 208 to be played as samples.

In a variation of the above-discussed alternate embodiment, first processing device 202 may not be included. Thus, third processing device 208 may communicate with second processing device 106 without communicating through first processing device 202.

Exemplary Processing Device

FIG. 3 is a functional block diagram of an exemplary processing device 300, which may be used to implement embodiments of first processing device 102, 202, second processing device 106, or third processing device 208 consistent with the subject matter of this disclosure. Processing device 300 may include a bus 310, an input device 320, a memory 330, a read only memory (ROM) 340, an output device 350, a processor 360, a storage device 370, and a communication interface 380. Bus 310 may permit communication among components of processing device 300.

Processor 360 may include at least one conventional processor or microprocessor that interprets and executes instructions. Memory 330 may be a random access memory (RAM) or another type of dynamic storage device that stores information and instructions for execution by processor 360. Memory 330 may also store temporary variables or other intermediate information used during execution of instructions by processor 360. ROM 340 may include a conventional ROM device or another type of static storage device that stores static information and instructions for processor 360. Storage device 370 may include a medium for storing data and/or instructions for processor 360.

Input device 320 may include a keyboard, a touchscreen, a pointing device or other input device. Output device 350 may include one or more conventional mechanisms that output information, including one or more display monitors, or other output devices.

Processing device 300 may perform functions in response to processor 360 executing sequences of instructions contained in a tangible machine-readable medium, such as, for example, memory 330, ROM 340, storage device 370 or other medium. Such instructions may be read into memory 330 from another machine-readable medium or from a separate device via communication interface 380.

Exemplary System

FIG. 4 is a functional block diagram illustrating an exemplary system 400 consistent with the subject matter of this disclosure. Components of the system 400 may be included in a single device or multiple devices, such as, for example, first processing device 102, 202, second processing device 106, and third processing device 208. System 400 may include a content type receiver 402, a query producer 404, a content retriever 406, a feedback receiver 408, a media content purchase facilitator 410, a content provider 412, a media content tracker 414, a content player 416, a content requester 418, and a location determiner 420.

Content type receiver 402 may receive information with respect to a type of content a user desires to hear or view. In one embodiment, the received information may include feature vectors associated with media content stored in a media store of the user. In a second embodiment, the received information may include feature vectors associated with media content played during a particular time interval. In another embodiment, the received information may include one or more of feature vectors corresponding to a center of one or more clusters formed from the feature vectors associated with the media content stored in the media store, or the feature vectors associated with the media content played during the particular time interval. In further embodiments, the received information may include other data indicating media content the user may desire to hear or view.

Query producer 404 may produce a query based on the received information from content type receiver 402. The query may include one or more feature vectors corresponding to the media content the user may wish to hear or view. The feature vectors may include the feature vectors associated with the media content stored in the media store, the feature vectors associated with media content played during the particular time interval, or one or more feature vectors corresponding to the center of the one or more clusters formed from either of the above-mentioned feature vectors.

Content retriever 406 may retrieve media content based on a query from query producer 404 and may provide the retrieved media content to content provider 412. Content provider 412 may receive the retrieved media content from content retriever 406, may provide information regarding the retrieved content to media content tracker 414, and may provide the retrieved media content to content player 416, which may play the media content. The information regarding the retrieved content, which may be provided to media content tracker 414, may include one or more feature vectors associated with the retrieved media content. Media content tracker 414 may provide information regarding provided media content, such as, for example, the one or more feature vectors associated with the retrieved media content, or other information to query producer 404 for forming a next query.

Content player 416 may play the media content. For example, if the media content is music content, content player 416 may play the music content. If the media content is electronic book content, content player 416 may play the electronic book content by making the electronic book content viewable to a user. Therefore, playing media content may include playing audio content, or making visual content viewable.

Further, content player 416 may transparently provide relevance feedback to feedback receiver 408. For example, if playing of media content by content player 416 is interrupted such that the media content may not be played, in some embodiments, negative relevance feedback may be provided by content player 416 to feedback receiver 408 to indicate that the user does not like the media content. If the user purchases the media content via system 400, media content purchase facilitator 410 may provide positive relevance feedback to feedback receiver 408 to indicate that the user likes the purchased media content. Query producer 404 may then update the produced query provided to content retriever 406 by weighing down the effect of one or more feature vectors corresponding to the provided negative relevance feedback, or weighing up the effect of one or more feature vectors corresponding to the provided positive relevance feedback.

Media content purchase facilitator 210 may provide a facility for purchasing media content via an interface by which a user may purchase sampled media content not already owned by the user.

Content requester 418 may provide a facility by which a user may request media content via an interface. Content requester 418 may provide an indication of the requested media content to content retriever 406, which may then attempt to retrieve the requested media content and provide the retrieved media content to content provider 412.

Location determiner 420 may determine a location of a processing device playing the media content. The determination may be made via a portion of a global positioning system (GPS), or other location determining component, which may be included in location determiner 420. Location determiner 420 may provide location information to media content tracker 414 for tracking locations where items of media content were played, which may be factored into media content recommendations.

In some embodiments, query producer 404, content player 416, media purchase facilitator 410, and location determiner 420 may reside in a single device, such as, for example, a single processing device. In such embodiments, a query for similar context may be assembled where media content is consumed and may be based on the consumed media content. Further, information with respect to how, when, and/or where the media content is consumed may be collected and used to improve relevance with respect to results of a similarity search for similar media content.

Feature Vectors

Figure 5:
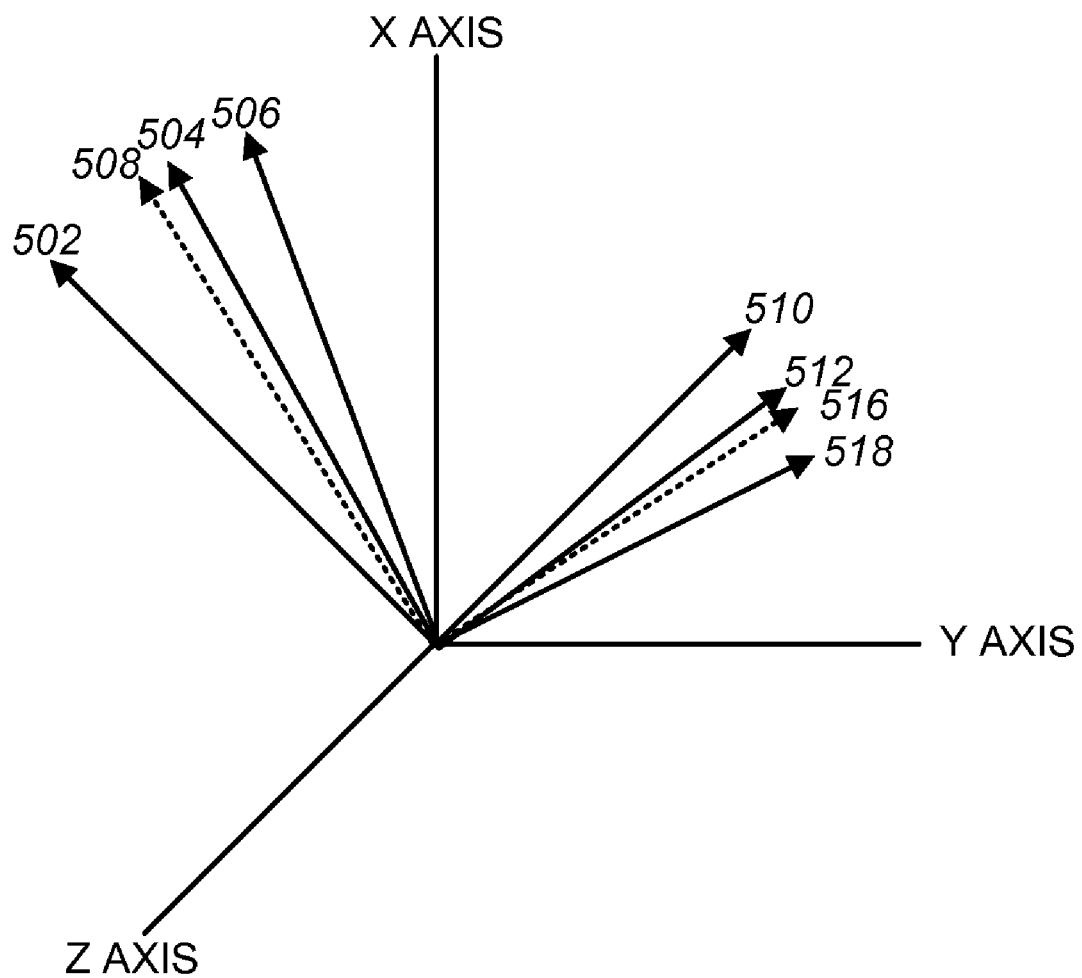
FIG. 5 illustrates exemplary feature vectors and clustering of the exemplary feature vectors in embodiments consistent with the subject matter of this disclosure.

As mentioned above, each feature vector may correspond to a number of features associated with an item of media content. The feature vectors are n-dimensional, where n typically is in the order of hundreds. FIG. 5 illustrates several three-dimensional feature vectors, which may correspond to media content. Three-dimensional vectors are illustrated in FIG. 5 because a three-dimensional vector is easy to illustrate and easy for a reader to understand. Three-dimensional vectors 502, 504, 506, 510, 512, and 518 may each correspond to media content a user may desire to play. In this example, two clusters may be formed from the feature vectors. A first cluster may be formed based on feature vectors 502, 504 and 506, and a second cluster may be formed based on feature vectors 510, 512 and 518. A center of each of the clusters may be determined and feature vectors 508, 516 may be computed to correspond to the center of the first cluster and the second cluster, respectively. One or both of feature vectors 508, 516 may be included in a query for finding similar media content.

Exemplary Processing

Figure 6:
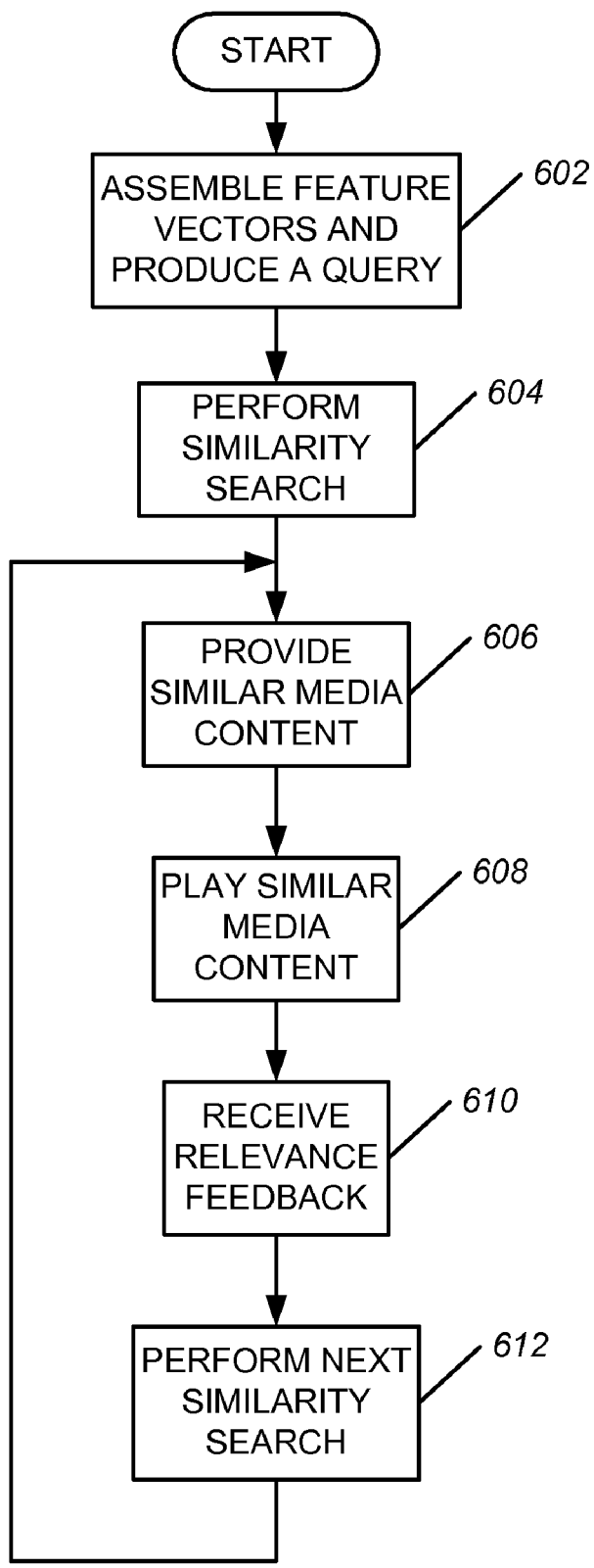

FIG. 6 is a flowchart illustrating an exemplary process, which may be performed in embodiments consistent with the subject matter of this disclosure. The process may begin by content type receiver 402 assembling feature vectors corresponding to media content that a user likes (act 602). In one embodiment, the assembled feature vectors may correspond to media content purchased by the user, media content stored in a media store of the user, or media content requested by the user and played.

Next, query producer 404 may receive the assembled feature vectors and may prepare one or more query vectors for a similarity search for similar media content (act 604). FIG. 7 is a flowchart illustrating exemplary processing, which may be performed in embodiments consistent with the subject matter of this disclosure when preparing the query and performing a similarity search, with respect to act 604, or when performing a next similarity search, with respect to act 612.

The process may begin with query producer 404 determining whether a current similarity search is a first similarity search to be performed (act 702). If this is not a first similarity search, then query producer 404 may update the feature vectors based on relevance feedback (act 704). The feedback may provide an indication as to whether a sampled item of media content is liked or disliked by the user. If the relevance feedback indicates that the played sampled item of media content is disliked by the user, then an effect of one or more feature vectors, corresponding to the sampled item of media content, may be weighed down with respect to the assembled feature vectors. If the feedback indicates that the sampled item of media content is liked by the user, then an effect of the one or more feature vectors corresponding to the sampled item of media content may be increased by, for example, weighing up an effect of the one or more feature vectors.

After updating the feature vectors (act 704), or after determining that a current similarity search is a first similarity search (act 702), one or more clusters corresponding to the updated feature vectors may be formed (act 706). Query producer 404 may then determine a feature vector corresponding to a respective center of each of the one or more clusters (act 708). Content retriever 406 may receive a query, from query producer 404, including the feature vector(s) corresponding to a respective center of each of the one or more clusters and may compute a similarity between the query feature vector(s) and the feature vectors corresponding to items of other media content (act 710). The other media content may be stored in a media store locally or remotely. The items for which the similarity to one of the feature vectors corresponding to a center of one of the clusters exceeds a predetermined threshold may then be selected by content retriever 406 for sampling (act 712). In some embodiments, an audio or visual indication may be provided to indicate that current playing media content is sampled media content not owned by the user.

Returning to FIG. 6, content provider 412 may provide the selected one or more similar items of the other media content to content player 416 for playing (act 606; FIG. 6). The one or more similar items of the other media content may then be played (act 608).

Relevance feedback may then be received, with respect to the one or more similar items of the other media content (act 610). The feedback may be transparently or non-transparently provided. A next similarity search may be performed to find one or more additional similar items of the other media content, taking into consideration the received relevance feedback (act 612). Acts 606-612 may then be repeated.

FIG. 8 is a flowchart of an exemplary process for transparently and non-transparently providing relevance feedback. The process may begin with receiving input from a user (act 802). A determination may be made regarding whether the input concerns purchasing sampled media content (act 804). If the input concerns purchasing the sampled media content, then media content purchase facilitator 410 may provide positive relevance feedback to feedback receiver 408, with respect to the sampled media content (act 806) and media content purchase facilitator 410 may facilitate a purchase of the media content via a processing device for playing the media content (act 808).

If the received input does not concern purchasing sampled media content, then a determination may be made regarding whether the received input will prevent the media content from completing playing (act 810). If the media content is prevented from completing playing, then content player 416 may provide negative relevance feedback with respect to the played sampled media content (act 812). Processing may then be performed regarding the received input (act 814).

If, during act 810, the media content is determined not to be prevented from completing playing, then a determination may be made regarding whether the received input includes explicit relevance feedback from the user, with respect to the sampled media content (act 816). If the received input is determined not to include explicit relevance feedback from the user, then processing regarding the input may be performed (act 814). Otherwise, a determination may be made regarding whether the explicit relevance feedback is positive feedback (act 818). If the received explicit feedback is positive relevance feedback, then positive relevance feedback may be provided to feedback receiver 408 (act 820). Otherwise, negative relevance feedback may be provided to feedback receiver 408 (act 822).

Variations of Embodiments

In some variations of embodiments, media content requested by a user and similar media content to be sampled may be interleaved. For example, as shown by FIG. 9, content provider 412 may provide items of found similar content to similar media content queue 902 and items of user requested media content to requested media content queue 904. Content player 416 may then obtain items of media content to play from similar media content queue 902 and requested media content queue 904 in an interleaved fashion.

In another variation of the embodiment illustrated by FIG. 9, items of media content in requested media content queue 904 may be given a higher priority than items of media content of similar media content queue 902, such that, for example, when content player 416 is to obtain a next item of media content to play, then next item of media content may be from requested media content queue 904, as long as requested media content queue 904 is not empty. When requested media content queue 904 is empty, then content player 416 may obtain the next item of media content to play from similar media content queue 904.

FIG. 10 illustrates a variation of embodiments in which media content may be received via a number of media content streams 1004-1010. Content retriever/provider 1002 may retrieve media content from one of media content streams 1004-1010 and may provide the retrieved media content to content player 416 for playing. Each item of media content included in media content streams 1004-1010 may further include a corresponding feature vector. Media content tracker 414 (FIG. 4) may monitor feature vectors corresponding to items of media content provided to content player 416 by content retriever/provider 1002. Query producer 404 may produce a query including one or more feature vectors based on the monitored feature vectors, as described above. Query producer 404 may provide the one or more feature vectors to content retriever/provider 1002, which may then compare the one or more feature vectors from query producer 404 to feature vectors corresponding to each of media content streams 1004-1010. If a different media content stream has a feature vector more similar to one of the one or more feature vectors from query producer 404, then an indication may be displayed to a user to inform the user that another media content stream may have content the user would enjoy more. The user may then enter a command such that content retriever/provider 1002 may obtain items of media content from a different media content stream and may provide the obtained items of media content to content player 416 for playing. In a variation, instead of providing an indication to the user to inform the user that another media content stream may have content the user would enjoy more, content retriever/provider 1002 may automatically begin retrieving items of media content from the different media content stream and may provide the items of media content to content player 416 for playing.

Figure 11:
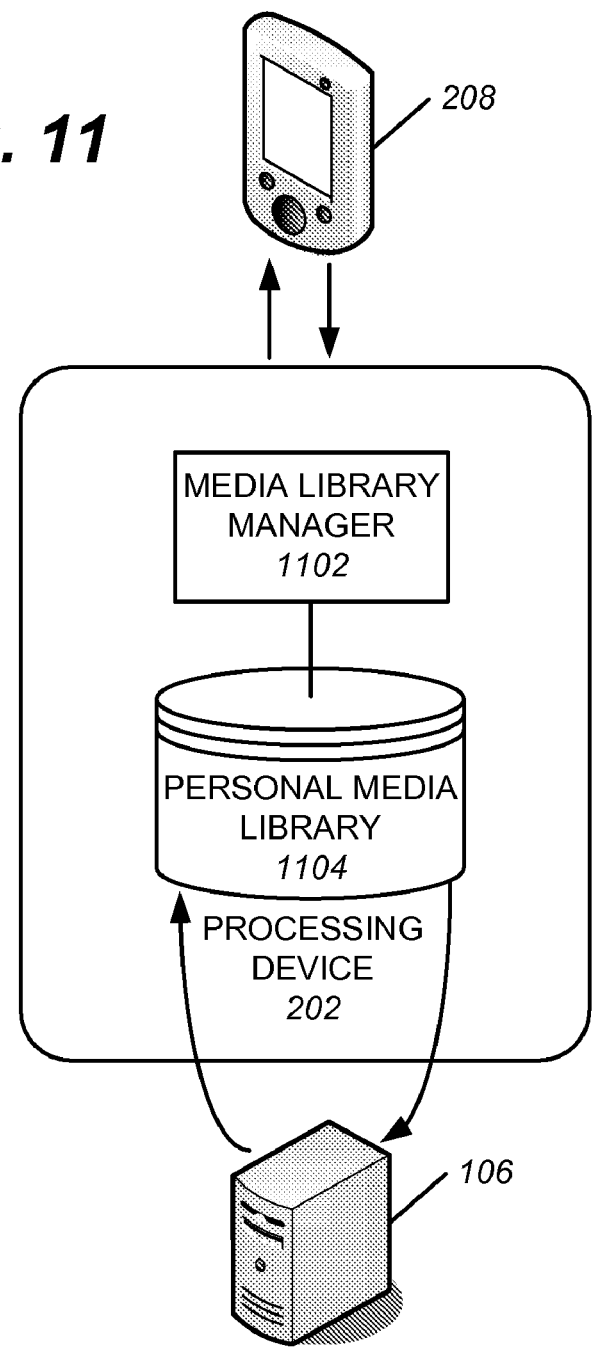

FIG. 11 illustrates a variation of an embodiment illustrated in FIG. 2. Third processing device 208 may communicate with first processing device 202 to request and retrieve items of media content. First processing device 202 may include a media library manager 1102 and a personal media library 1104. Media library manager 1102 may perform processing with respect to managing personal media library 1104. Personal media library 1104 may include purchased items of media content as well items of media content for sampling. First processing device 202 may send a query to a media content service, provided by second processing device 106 to request similar media content. The query may include one or more feature vectors based on items of media content stored in personal media library 1104 and owned by a user. Second processing device 106 may provide items of media content for sampling to first processing device 202, which may then provide the items of media content to third processing device 208 for playing.

Figure 12:
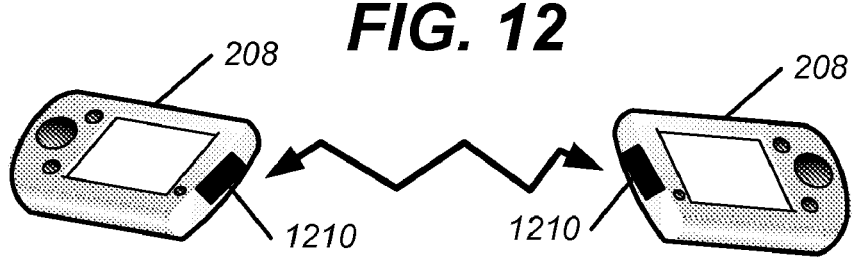

FIG. 12 illustrates another variation of embodiments in which third processing device 208 may communicate items of media content and associated feature vectors to other third processing device 208. Other third processing device 208 may be permitted to play the communicated items of media content up to a predetermined number of times. Other third processing device 208 may initiate a query to a media content service, implemented in second processing device 106, to obtain items of media content similar to the communicated items of media content based on the associated feature vectors. The media content service may obtain and provide the similar items of media content to other third processing device 208, either directly or via another processing device.

Third processing devices 208 may communicate with one another via wired or wireless communications. In some embodiments, third processing devices 208 may communicate with one another via infrared communication ports 1210.

Figure 13:
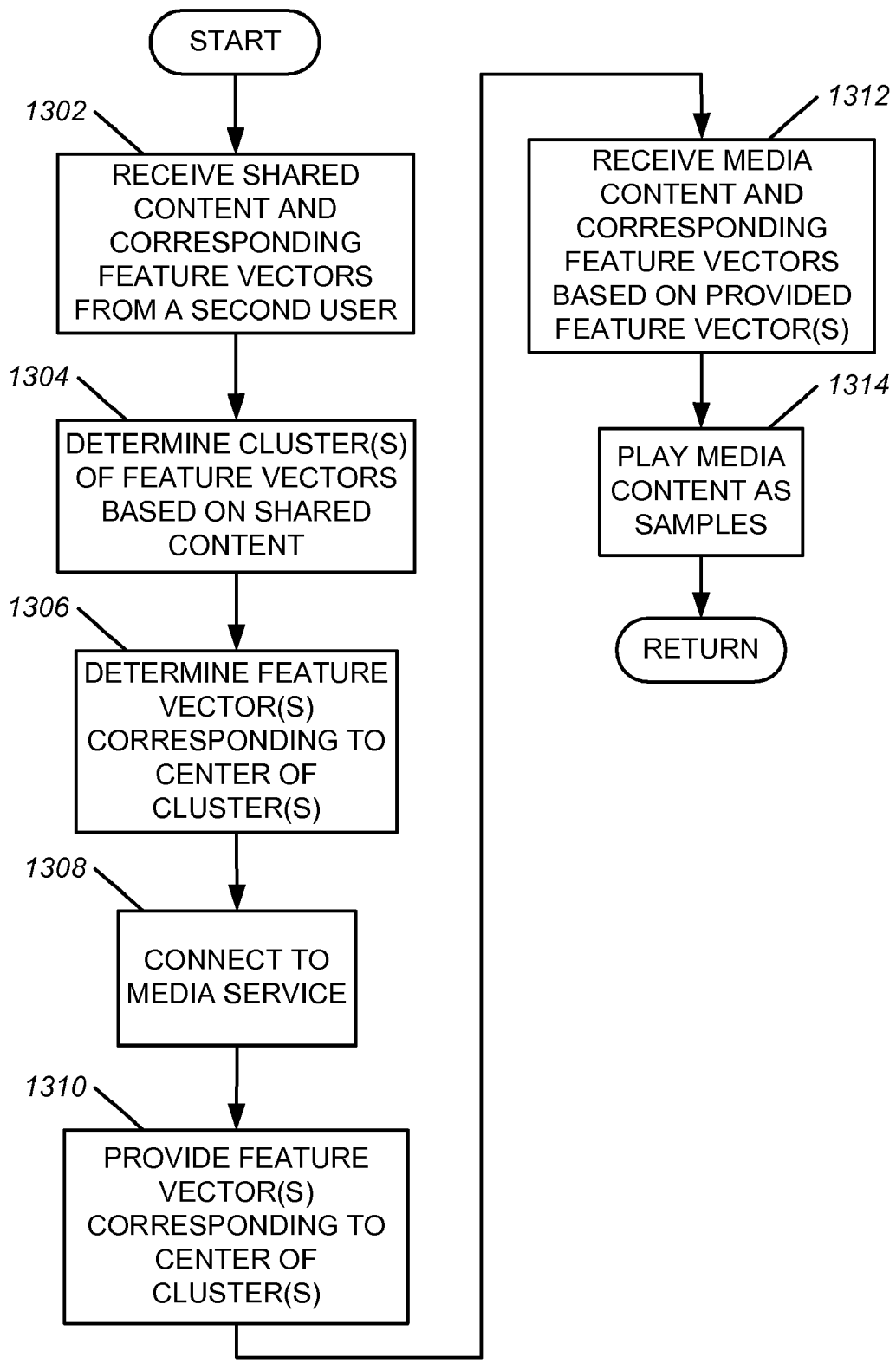

FIG. 13 is a flowchart illustrating exemplary processing in the variation illustrated in FIG. 12. The process may begin with other third processing device 208 receiving shared media content and corresponding feature vectors from third processing device 208, operated by a second user (act 1302). Other third processing device 208 may determine one or more clusters of feature vectors based on the received shared media content (act 1304). One or more feature vectors corresponding to a center of the one or more clusters may then be determined (act 1306). Other third processing device 208 may then connect to a media service, which may be implemented in second processing device 106 (act 1308) and the one or more feature vectors corresponding to the center of the one or more clusters may then be provided by other third processing device 208 to the media service (act 1310). Other third processing device 208 may then receive media content and corresponding feature vectors from the media service, based on the provided one or more feature vectors (act 1312). Other third processing device 208 may then play the received media content as samples (act 1314).

In the variation described with respect to FIGS. 12 and 13, relevance feedback may be provided transparently and/or non-transparently, as previously described. The one or more feature vectors may then be updated based on the provided relevance feedback and again sent to the media service. The media service may then provide media content and corresponding feature vectors more in line with a taste of the second user.

In another variation, a user may specify a time of day and a day of week. Media content tracker 414 (FIG. 4) may track played content including a time of day and a day of week items of media contents were played. Upon receiving the specified time of day and day of the week, media content tracker 414 may assemble feature vectors corresponding to content played during the specified time of day and the day of the week. The assembled feature vectors may then be provided to query producer 404 to produce one or more feature vectors based on a center of clusters formed by the assembled feature vectors. Media content may then be retrieved and played as described previously, with respect to FIG. 4. Further, relevance feedback may be provided transparently or non-transparently. Query producer 404 may receive the relevance feedback and may update the produced one or more feature vectors based on the received relevance feedback, as previously described.

In another variation, a user may specify one or more locations. Media content tracker 414 (FIG. 4) may track content played at different locations. Upon receiving the specified one or more locations, media content tracker 414 may assemble feature vectors corresponding to content played at the specified one or more locations. The assembled feature vectors may then be provided to query producer 404 to produce one or more feature vectors based on a center of clusters formed by the assembled feature vectors. Media content may then be retrieved and played as described previously, with respect to FIG. 4.

In yet another variation, the previous two variations may be combined such that a user may request playing of media content similar to media content played at particular locations on specified days and times.

Conclusion

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 6-8 and 13, or may implement acts in a different order than as shown. Accordingly, the appended claims and their legal equivalents define the invention, rather than any specific examples given.

I claim as my invention:

1. A machine-implemented method for similarity-based content sampling of media content, the machine-implemented method comprising:

assembling a query corresponding to feature vectors of media content played on a device, the query being assembled by a component located in the device that consumed the media content;

performing a similarity search, based on the feature vectors corresponding to the query, for other media content;

playing the other media content based on a result of the similarity search; and repeatedly performing acts comprising:
  transparently providing relevance feedback, with respect to the other media content played on the device, the transparently providing relevance feedback further comprising:
    providing a first relevance feedback as a result of a user purchasing an item of the other media content or an item of additional media content via the device, and
    providing a second relevance feedback as a result of interrupting a playing of an item of the other media content or an item of the additional media content on the device;
  performing a next similarity search for the additional media content based, at least in part, on the feature vectors of the media content played on the device and the relevance feedback, the performing a next similarity search comprising:
    determining at least one cluster of feature vectors based on the feature vectors of the media content played on the device and the relevance feedback,
    determining a feature vector corresponding to a center of the determined at least one cluster,
    determining a similarity between the feature vector corresponding to the determined at least one cluster and a feature vector included in each of a plurality of streams of media content, and
    informing the user of an other of the plurality of streams of media content when the other of the plurality of streams of media content includes the feature vector more similar to the feature vector corresponding to the determined at least one cluster than the feature vector of a currently playing one of the plurality of streams of media content; and
  playing the additional media content based on a result of the next similarity search, wherein:
the media content is received via one of the plurality of streams of media content, and
each of the plurality of streams of media content include the feature vector describing aspects of the media content.

2. The machine-implemented method of claim 1, further comprising:
  providing a facility for purchasing, via the device, an item of the played other media content or an item of the played additional media content, wherein
  the providing a first relevance feedback as a result of a user purchasing an item of the other media content or an item of the additional media content further comprises:
    providing positive relevance feedback with respect to the item of the other media content or the item of the additional media content as a result of the item of the other media content or the item of the additional media content being purchased via the facility for purchasing an item of the played other media content or an item of the played additional media content, and
    providing negative relevance feedback with respect to the item of the other media content or the item of the additional media content as a result of the interrupting of the playing, on the device, of the item of the other media content or the item of the additional media content.

3. The machine-implemented method of claim 1, further comprising:
  receiving explicitly provided relevance feedback from a user with respect to the other media content or the additional media content;
  determining whether the explicitly provided relevance feedback is positive relevance feedback or negative relevance feedback;
  providing the positive relevance feedback to a feedback receiver when the explicitly provided relevance feedback is determined to be the positive relevance feedback; and
  providing the negative relevance feedback to the feedback receiver when the explicitly provided relevance feedback is determined to be the negative relevance feedback.

4. The machine-implemented method of claim 1, further comprising:
  providing an indication when playing the other media content or the additional media content.

5. The machine-implemented method of claim 1, further comprising:
  tracking the media content played on the device by time of day and day of week; and
  providing a facility for a user to request playing of media content similar to items of the media content played at specified times of the day and specified days of the week.

6. The machine-implemented method of claim 1, further comprising:
  tracking the media content played on the device by a location at which the device plays the media content; and
  providing a facility for a user to request playing of media content similar to items of the media content played by the device at one or more specified locations.

7. The machine-implemented method of claim 1, wherein the informing the user of an other of the plurality of streams of media content further comprises:
  automatically playing the other one of the plurality of streams of media content.

8. A system comprising:
  at least one processor; and
  at least one memory having instructions stored therein, the instructions comprising:
    instructions for playing items of media content on a device, the items of media content having corresponding feature vectors, the media content being received via one of a plurality of streams of media content, each of the plurality of streams of media content including a feature vector describing aspects of the media content;
    instructions for determining, on the device, at least one cluster based on the feature vectors corresponding to the played items of media content;
    instructions for determining at least one vector corresponding to a respective center of the at least one cluster;
    instructions for searching for at least one closest matching feature vector, with respect to the at least one vector, from among the plurality of feature vectors of the plurality of streams corresponding to other media content, the instructions for searching for at least one closest matching feature vector further comprising:
      instructions for determining a similarity between the at least one vector corresponding to the respective center of the at least one cluster and the respective feature vector included in each of the plurality of streams of media content, and
      instructions for informing a user of an other of the plurality of streams of media content when the feature vector of the other of the plurality of streams of media content is more similar to the feature vector corresponding to the determined at least one cluster than the feature vector of a currently playing one of the plurality of streams of media content;

instructions for playing an item of the other of the plurality of streams of media content;

instructions for transparently providing a negative relevance feedback, with respect to the item of the other of the plurality of streams of media content as a result of a user interrupting playing of the item of the other of the plurality of streams of media content on the device; and instructions for transparently providing a positive relevance feedback, with respect to the item of the other of the plurality of streams of media content as a result of the item of the other of the plurality of streams of media content being purchased via the device.

9. The system of claim 8, wherein the instructions further comprise:

instructions for weighing down an effect of a feature vector, corresponding to the item of the other of the plurality of streams of media content, on the determined at least one vector corresponding to the respective center of the at least one cluster when the negative relevance feedback is provided; and instructions for weighing up the effect of the feature vector, corresponding to the item of the other of the plurality of streams of media content, on the determined at least one vector corresponding to the respective center of the at least one cluster when the positive relevance feedback is provided.

10. The system of claim 7, wherein the instructions further comprise:

instructions for determining a location of the device, wherein the instructions for determining at least one cluster based on the feature vectors corresponding to the played items of media content further comprise instructions for determining the at least one cluster based on feature vectors corresponding to ones of the items of played media content played by the device at a specified location.

11. The system of claim 8, wherein the instructions for determining at least one cluster based on the feature vectors corresponding to the played items of media content further comprise instructions for determining the at least one cluster based on feature vectors corresponding to ones of the items of played media content played by the device on a specified day of a week and a specified time of day.

12. The system of claim 8, wherein the instructions further comprise:

instructions for providing an indication when the device is playing the item of the other of the plurality of streams of media content.

13. The system of claim 8, wherein the instructions further comprise:

instructions for determining at least one second cluster based on feature vectors corresponding to ones of the items of media content stored on the device, instructions for determining at least one second vector corresponding to a respective center of the at least one second cluster, instructions for searching for at least one other closest matching feature vector, with respect to the at least one second vector, from among the plurality of feature vectors of the plurality of streams corresponding to the other media content, and instructions for playing an item of one of the plurality of streams of media content corresponding to the at least one other closest matching feature vector.

14. The system of claim 8, wherein the instructions further comprise:

instructions for receiving shared media content from a second user, and instructions for connecting to a media service and sampling media content similar to the received shared media content from the second user based on feature vectors corresponding to the received shared media content.

* * * * *

UNITED STATES PATENT AND TRADEMARK OFFICE
CERTIFICATE OF CORRECTION

| | | |
|---|---|---|
| PATENT NO. | : 7,958,130 B2 | Page 1 of 1 |
| APPLICATION NO. | : 12/127002 | |
| DATED | : June 7, 2011 | |
| INVENTOR(S) | : Manolescu | |

It is certified that error appears in the above-identified patent and that said Letters Patent is hereby corrected as shown below:

In column 13, line 28, in Claim 10, delete "7," and insert -- 8, --, therefor.

Signed and Sealed this
Thirteenth Day of September, 2011

David J. Kappos
*Director of the United States Patent and Trademark Office*